(12) United States Patent
Cutter (10) Patent No.: US 6,487,550 B1
(45) Date of Patent: Nov. 26, 2002

(54) METHOD AND APPARATUS FOR FINDING A FIRST ELEMENT

(75) Inventor: Douglas J Cutter, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/497,332

(22) Filed: Feb. 3, 2000

(51) Int. Cl.[7] .............................................. G06F 17/30
(52) U.S. Cl. ......................................................... 707/3
(58) Field of Search ....................... 707/2, 3, 5; 326/38, 326/95; 327/152, 291; 345/835; 341/81, 67; 365/201; 375/240.03; 703/13; 712/200, 238; 714/724, 736, 781; 717/110; 716/4, 6

(56) References Cited

U.S. PATENT DOCUMENTS 5,859,999 A    1/1999   Morris et al. ................ 395/565
5,860,017 A    1/1999   Sharangpani et al. .. 395/800.23
6,266,375 B1 * 7/2001   Chang et al. .......... 375/240.03

OTHER PUBLICATIONS

Wolfe, A., "Patents shed light on Merced's Innards", Electronic Engineering Times, Feb. 15, 1999.

* cited by examiner

Primary Examiner—Diane D. Mizrahi
Assistant Examiner—Apu M Mofiz (57) ABSTRACT

Disclosed are methods and apparatus for finding an element meeting a predetermined condition among an ordered set of N elements. The method subdivides the ordered set of N elements into M subsets, wherein $1<M<N$. A particular one of the M subsets contains K elements. The method determines if the particular subset contains an element meeting the predetermined condition. The method also identifies which of the K elements in the particular subset is the first element meeting the predetermined condition.

15 Claims, 5 Drawing Sheets

METHOD AND APPARATUS FOR FINDING A FIRST ELEMENT

TECHNICAL FIELD

The invention relates to digital electronic circuitry and algorithms for searching. More particularly, the invention relates to digital electronic circuitry and algorithms for quickly and efficiently finding a first element having a predetermined state among an ordered set of elements.

BACKGROUND ART

Data structures in an ordered relationship, such as queues, buffers and stacks, are common in software and digital electronics. Known techniques for finding a first element meeting a specified condition in an ordered data structure are serial in nature. That is, known techniques proceed element-by-element from the beginning end of the data structure towards the opposite end, testing each element in turn for the specified condition until the specified condition is met. The time required to perform such a serial find operation on a data structure having N elements is on the order of N (i.e., O(N)) in the worst case and on the order of N/2 (i.e., O(N/2)) on average. The execution time is measured in gate delays for a hardware implementation of the technique or in terms of processor cycles for a software implementation. The execution time can be prohibitively large when N is large.

SUMMARY OF INVENTION

In one respect, the invention is a method for finding an element meeting a predetermined condition among an ordered set of N elements. The method subdivides the ordered set of N elements into M subsets, wherein 1<M <N. A particular one of the M subsets contains K elements. The method determines if the particular subset contains an element meeting the predetermined condition. The method also identifies which of the K elements in the particular subset is the first element meeting the predetermined condition. As necessary, the method can process other of the M subsets in a similar manner. Preferably, all of the M subsets are processed in parallel. Thus, the method decomposes the problem of finding a first one in a set of N into M much more manageable problems. The same basic method can then optionally be applied to the outputs of the basic method to further simplify the problem.

In another respect, the invention is an apparatus for use with a structure having N ordered locations. Each location is capable of storing a variable that can be in a plurality of states including a predetermined state. The apparatus comprises a plurality of first level circuit blocks. Each first level circuit block is connected to a subset of the N ordered locations, and each first level circuit block comprises a first logic gate and a first logic network. The first logic gate has a plurality of inputs, each of which is connected to an element of the subset of the N ordered locations. The first logic gate output is the predetermined state if at least one of the inputs is in the predetermined state. The first logic network also has a plurality of inputs, each of which is connected to an element of the subset of the N ordered locations. The first logic network outputs one or more signals indicative of the first location among the subset of the N ordered locations to be in the predetermined state. Optionally, the apparatus includes second and subsequent level logic blocks as necessary in a modular design.

In yet another respect, the invention is an apparatus for use with a structure having N ordered locations. Each location is capable of storing a variable that can be in a plurality of states including a particular state. The apparatus comprises a plurality of first presence determining means and a plurality of first indicating means. Each first presence determining means performs the function of determining if a subset of the N ordered locations contains an element having the predetermined state. Each of the first indicating means performs the function of indicating which element in a subset of the N ordered locations is the first element having the predetermined state in the subset. Each subset contains at least two of the N ordered locations.

In comparison to known methods and apparatus for finding a first element in an ordered data structure, certain embodiments of the invention are capable of achieving certain advantages, including the following:

(1) Certain embodiments of the invention are capable of much faster execution. In particular, the speed of execution can be made less dependent on the size of the data structure.

(2) Certain embodiments of the invention can be performed recursively or designed using modular hardware components.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
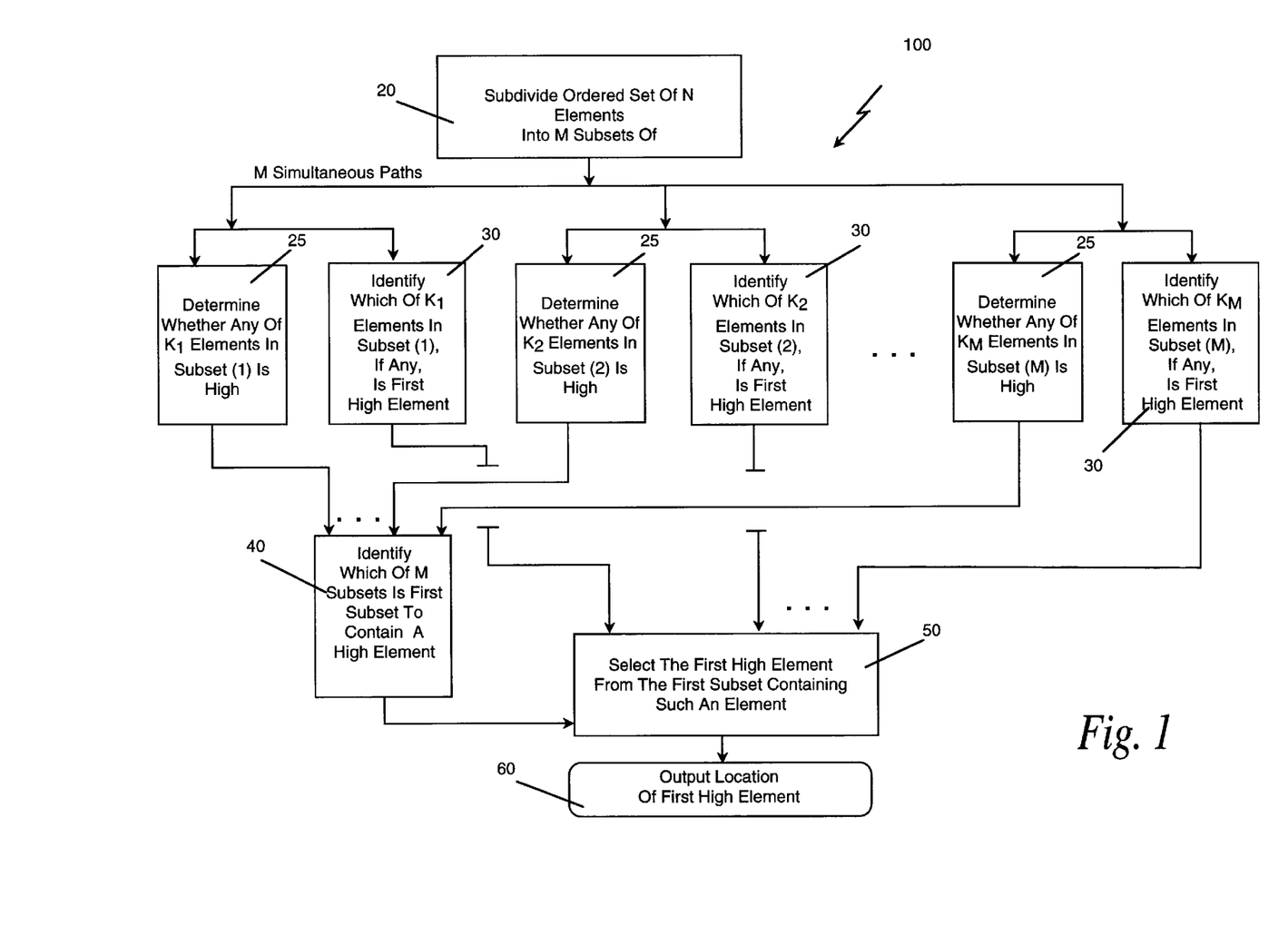
FIG. 1 is a flowchart of a method according to the invention.

FIG. 1 is a flowchart of a method 100 according to the invention. The goal of the method 100 is to determine which element of an ordered set of N elements is the first element meeting a predetermined condition. The variable N represents the number of elements in the ordered set of data that is being processed by the method 100. The method 100 begins by subdividing (20) the ordered set of N elements into M subsets having $K_1, K_2, \ldots, K_M$ respective elements each. The variable M represents the number of subsets that the ordered set of N elements is divided into. The variables $K_1, K_2, \ldots, K_M$ represent the number of data elements in each respective subset. Preferably, $K_1=K_2=\ldots=K_M=K=N/M$. The method 100 then proceeds along M parallel and simultaneous paths. In each of the M simultaneous paths (say the i-th path), two operations are undertaken in parallel. One operation involves determining (25) whether any of the $K_i$ elements of the i-th subset meets the predetermined condition. The other parallel operation involves identifing (30) which of the $K_i$ elements in the i-th subset, if any, is the first element that meets the predetermined condition.

At the completion of the operations described above for the M simultaneous paths, the output from all the determining steps 25 are input to a further identifying step 40 that identifies which of the M subsets is the first to contain an element meeting the predetermined condition. The operation of the identifying step 40 is similar to the identifying step 30, except that the operation is performed on the inputs from all the determining steps 25, representing the M subsets, rather than on elements of the original ordered set. The output of the identifying step 40, the identity of which of the M subsets contains the first element meeting the predetermined condition, is input to a selecting step 50. The selecting step 50 further accepts the outputs of all the identifying steps 30, containing the location of the first element meeting the predetermined condition in each of the M subsets. The selecting step 50 then produces an output 60 that identifies the first element in the ordered set of N elements meeting the predetermined condition.

Figure 2:
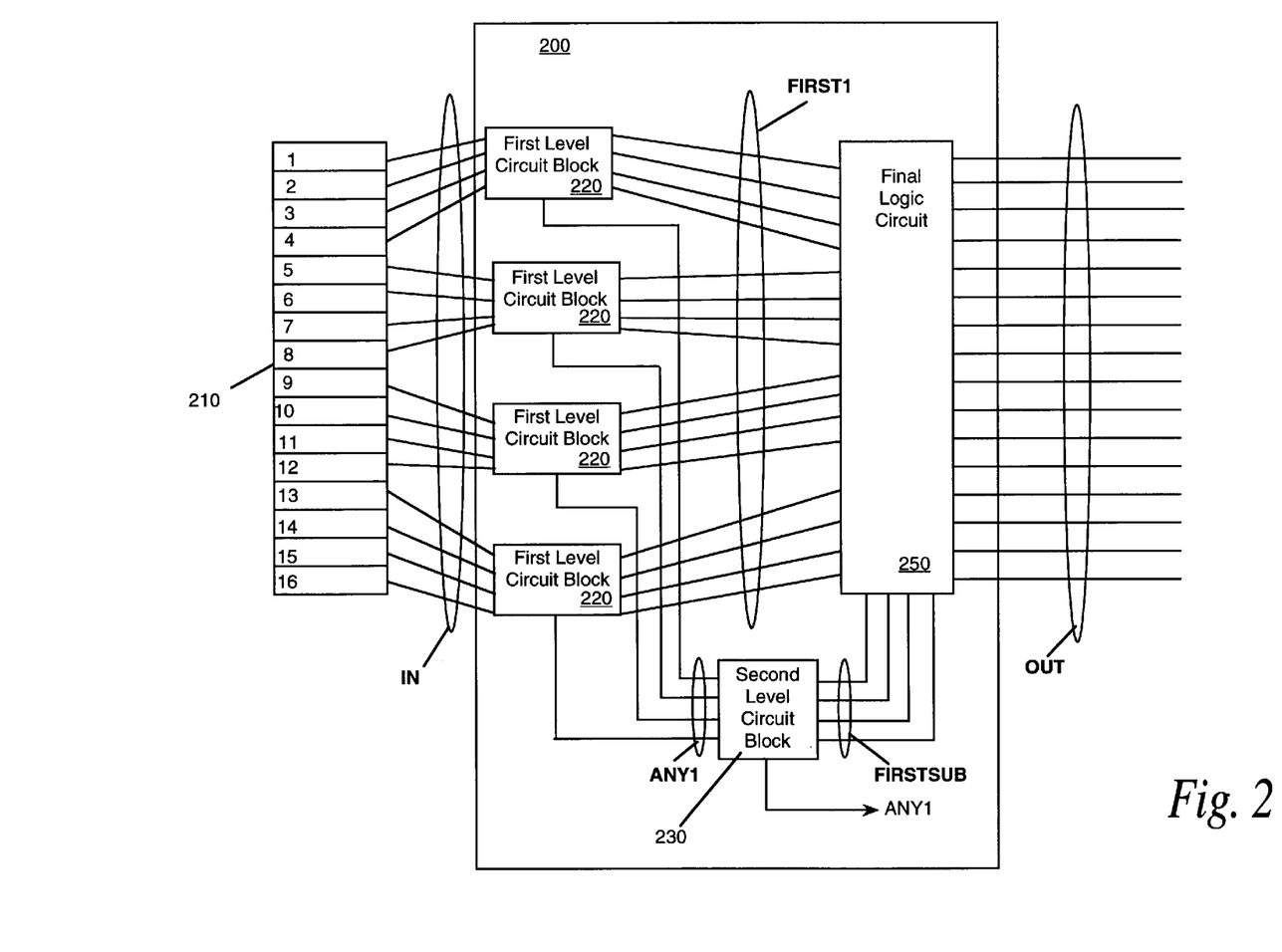
FIG. 2 is an overview block diagram of logic circuitry of an apparatus according to the invention.

FIG. 2 is an overview block diagram of logic circuitry of an apparatus 200 according to the invention, where N=16. A data structure 210 provides input to the apparatus 200. The data structure 210 may be all or part of a buffer, queue, stack or, more generally, any data structure having an ordered relationship among its elements. An exemplary use of the method 100 or the apparatus 200 in such a case is use with a not-recently-used (NRU) replacement scheme for the data structure 210. As will be readily apparent to those skilled in the art, any number of elements may reside in the data structure 210. In the case illustrated by the drawings, for purposes of simplicity of description, the data structure 210 contains sixteen elements numbered from 1 to 16. The predetermined condition for which this illustrative embodiment is searching is the condition of an element being, holding, or storing a 1(one) as a binary value.

The apparatus 200 is further composed of a number of first level circuit blocks 220, each connected to K elements within the data structure 210. In the case illustrated by the drawings, for purposes of simplicity of description, K=4, and there are four resulting first level circuit blocks 220 (i.e., M=4). Each first level circuit block 220 is also connected to a second level circuit block 230 through one output and to a final logic circuit 250 through four outputs. In addition to accepting four inputs, one each from the four first level circuit blocks 220, the second level circuit block 230 is also connected to the final logic circuit 250 by four outputs. The second level circuit block 230 may also provide an optional additional output, much as the first level circuit locks 220 do. This optional output is used in the case where the ordered set of N elements is subdivided into two or more subsets which are then further subdivided into M subsets ok K elements.

Each of the M first level circuit blocks 220 performs the function of determining whether any of the K inputs IN processed by it meet the predetermined condition, as described for the determining step 25 of the method 100 described above, and identifying which of the K elements, if any, meet the predetermined condition, as described for the identifying step 30 of the method 100 described above. The single output ANY1 from each of the first level circuit blocks 220 that is directed to the second level circuit block 230 signifies whether its respective subset of K elements contains an element that meets the predetermined condition. Using the inputs ANY1, the second level block 230 identifies which of the M subsets contains the first element that meets the predetermined condition, as described for the identifying step 40 of the method 100 described above. The K outputs FIRST1 from each of the first level circuit blocks 220 that are directed to the final logic circuit 250 identify which of the K elements in the subset M processed by that specific first level circuit block 220, if any, is the first element in that subset that meets the predetermined condition. The final logic circuit 250 performs the function of selecting which of the N elements is the first to meet the predetermined condition, as described for the selecting step 50 of the method 100 described above.

Figure 3:
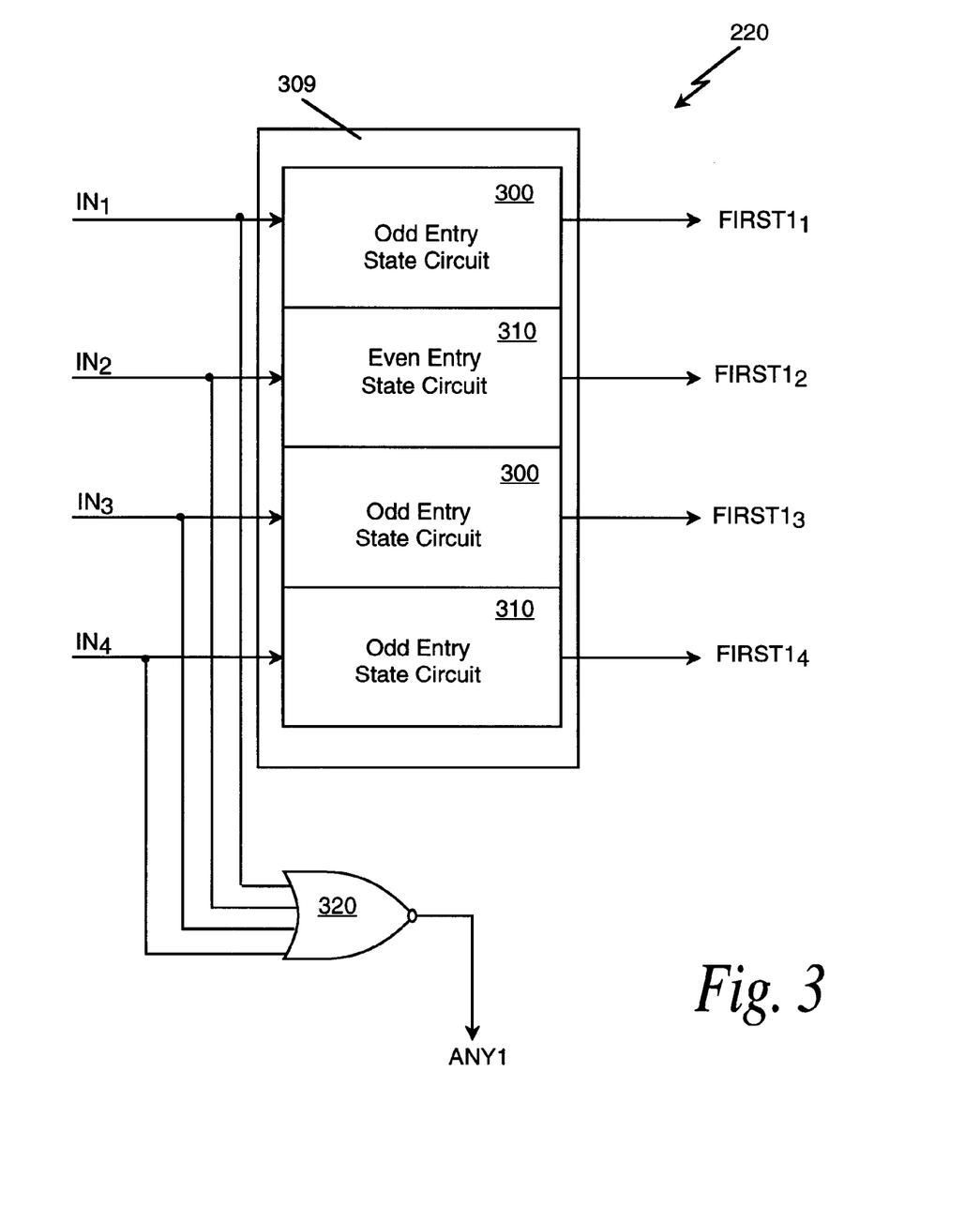
FIG. 3 is a more detailed block diagram of the components of the apparatus illustrated in FIG. 2.

FIG. 3 is a block diagram of the first level circuit blocks 220 of the apparatus 200. Each first level circuit block 220 is comprised of a specific number of odd-entry state circuits 300 and even-entry state circuits 310, as well as one OR gate 320. The OR gate 320 accepts input from each of the K elements in the data structure 210 assigned to this particular first level circuit block 220. The OR gate 320 produces an output that is high (i.e., set, set high, set to 1, one, or hot) if any of the K elements in its subset is set high and thus meets the predetermined condition.

There are a total of K/2 odd-entry and K/2 even-entry state circuits 300 and 310. The K elements of each subset are passed, each in order, as inputs IN into the odd-entry state circuits 300 and even-entry state circuits 310, respectively, of the first level circuit block 220 associated with the subset for those elements. Each of the K odd-entry and even-entry state circuits 300 and 310 produces an output FIRST1 that is high if it received as an input the first element meeting the predetermined condition within its associated subset. The resulting set of K outputs FIRST1, shown going to the right, will contain only one output meeting the predetermined condition, representing the first such element in the subset. In other words, the K outputs FIRST1 are in a one-hot condition if any of the K inputs IN are high. If all of the K inputs IN are low, all K outputs FIRST1 are low (i.e., an all-zero condition).

Figure 4A:
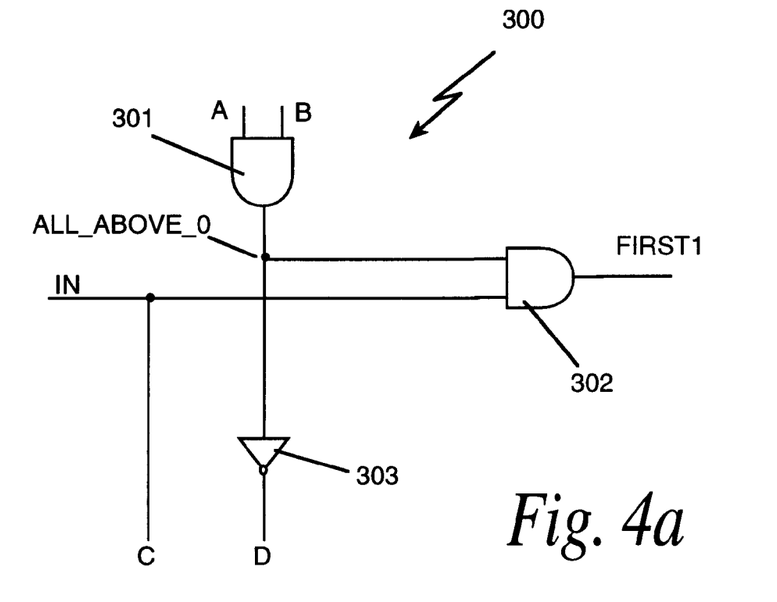
FIGS. 4A and 4B are circuit diagrams of the components shown in FIG. 3.
Figure 4B:
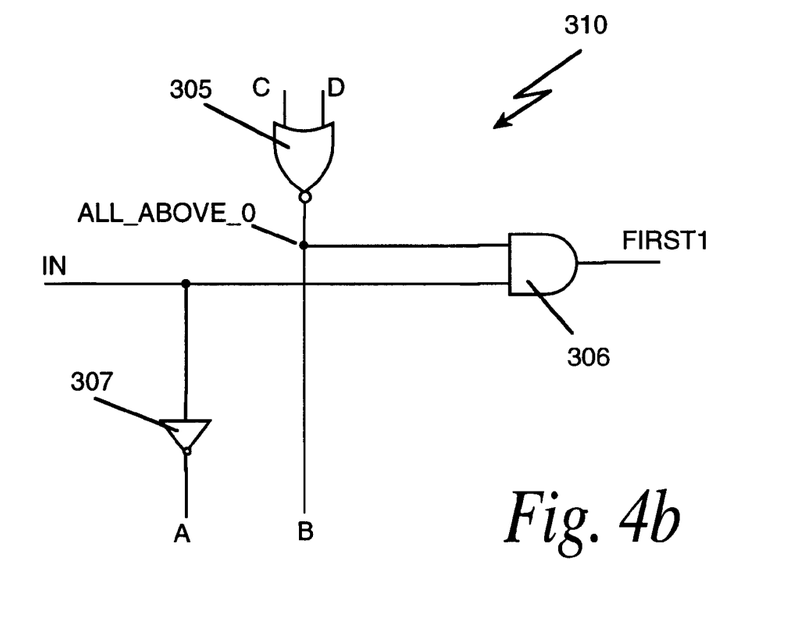

FIGS. 4A and 4B are circuit diagrams of the state circuits 300 and 310, respectively. The state circuits 300 and 310 are arranged in an alternating pattern, as shown in FIG. 3. An input signal IN is input to the state circuit 300 or 310 from a previous logic stage. An output signal FIRSTI is output from the state circuit 300 or 310 to a subsequent logic stage. To handle the dependencies between the state circuits 300 and 310, two signals C and D are passed from the state circuit 300 to an adjacent state circuit 310, and two signals A and B are passed from the state circuit 310 to an adjacent state circuit 300 lower in the row of alternating circuits.

The output signal FIRSTI of the state circuit 300 is high if the input signal IN is high and if all above input signals IN are zero. The latter condition is true when the node ALL_ABOVE_0=1, which occurs when both signals A and B are high. As can be seen from FIG. 4B, A=1 when IN=0 in the state circuit 310 immediately above, and B=1 when ALL_ABOVE_0=1 in the state circuit 310 immediately above. If the state circuit 300 is at the top of the row, then A and B can be explicitly set high.

The output signal FIRST1 of the state circuit 310 is high if the input signal IN is high and if all above input signals IN are zero. The latter condition is true when the node ALL_ABOVE_0=1, which occurs when both signals C and D are low. As can be seen from FIG. 4A, C=0 when IN=0 in the state circuit 300 immediately above, and D=0 when ALL_ABOVE_=1 in the state circuit 310 immediately above.

Although the state circuits 300 and 310 are depicted as being constructed from AND gates 301 and 302, an inverter 303, a NOR gate 305, an AND gate 306 and an inverter 307, other equivalent circuits will be readily apparent to those skilled in the art. For example, well-known gate transformations result in physically different yet logically identical circuits.

Figure 5:
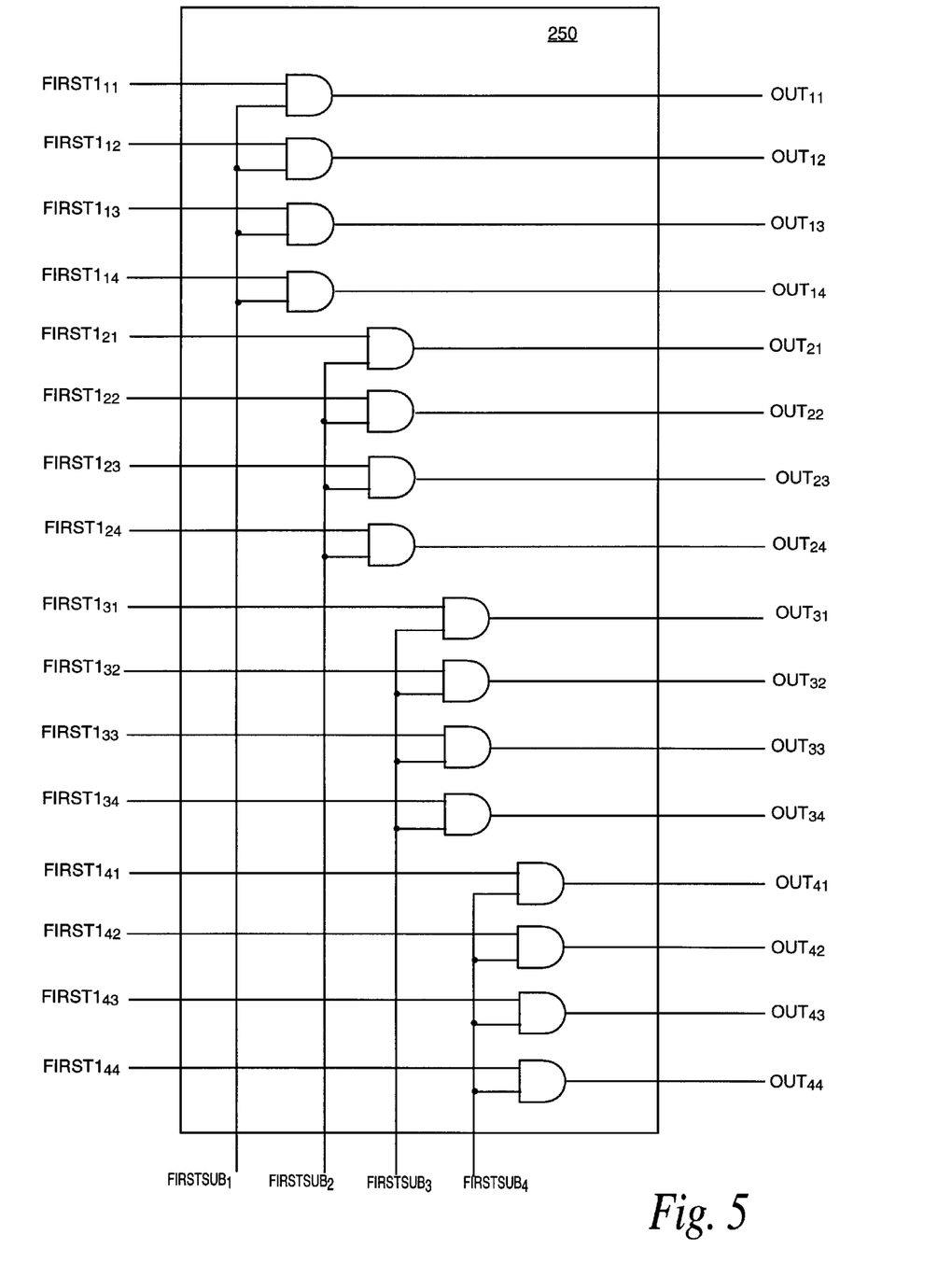
FIG. 5 is a circuit diagram of another component of the apparatus of FIG. 2.

FIG. 5 is a circuit diagram of the final logic circuit 250 in the apparatus 200. The inputs to the final logic circuit 250 are of two types. The inputs $FIRST1_{11}, \ldots, FIRST1_{44}$ (collectively FIRST1), shown on the left, are connected to the first level circuit blocks 220 and are, in contiguous groups of four, four sets of all-zero or one-hot lines. The inputs $FIRST\_SUB_1, \ldots, FIRST\_SUB_4$ (collectively FIRST_SUB), shown on the bottom, are connected to the second level circuit blocks 230 and are a single set of all-zero or one-hot lines that represent at a subset level resolution whether and which group of four is the first one to contain a one. The outputs $OUT_{11}, \ldots, OUT_{44}$ (collectively OUT) of the final logic circuit 250 are 16 lines shown on the right. The outputs OUT are also in either an all-zero or one-hot condition. The single hot bit in the outputs OUT, if any, corresponds to the input bit that is the first one overall.

Operation of the final logic circuit 250 is best understood by example. Suppose that the contents of the data structure 210 are 0000 0101 1011 1101, in order. In this case, the inputs FIRST1=0000 0100 1000 1000, and the inputs FIRST_SUB=0 1 0 0. Only the second AND gate of the second group of four AND gates produces a high output in this case. Thus, the output OUT=0000 0100 0000 0000, as it should be.

The apparatus 200 with sixteen inputs has been described above as an illustrative embodiment of the invention for the purpose of clearly and simply conveying the inventive concepts. Many modifications and variations to the apparatus 200 are possible. For example, the value of N, the size of the data structure 210 and hence the number of inputs to the apparatus 200, is largely arbitrary. Preferably N is a power of two, but this is not necessary. Also, the connections between the data structure 210 and the first level circuit blocks 220 need not be in contiguous groups. For example, the first logic block 210 could connect to elements 1, 5, 9, and 13 of the data structure 210, in that order; the next logic block 210 could connect to elements 2, 6, 10, and 14 of the data structure 210, in that order; the third logic block 210 could connect to elements 3, 7, 11, and 15 of the data structure 210, in that order; and the last logic block 210 could connect to elements 4, 8, 12, and 16 of the data structure 210, in that order—so long as the outputs FIRST1 from the first level circuit blocks 220 are connected to the final logic circuit 250 in the same pattern—and the apparatus 200 would still produce the correct outputs OUT. Furthermore, the values of M and K can be varied. As already mentioned, the size of each subset need not be uniform, though this is preferable. With larger values of N, M and/or K can grow and additional levels of circuitry can be added.

As an example of the variations possible, consider the case where N=128. Several different variations of the apparatus 200 are possible in this case. First, the same structural template as shown in FIG. 2 can be utilized where each of the first level blocks 220 and the second level block 230 grows to accomodate 32 input-output signals. That is, M=4 and K=32. The final logic circuit 250 would then grow accordingly to a "width" of 128 input-output lines (from left to right) with 32 FIRST_SUB inputs, as shown from the bottom. In a second variation for N=128, let M=16 and K=8. Now, visualize stacking two of the apparatus 200 atop each other. Let the width of the first level circuit blocks 220 be eight. Also let the width of the second level circuit blocks 230 be eight, and utilize the output ANY1 from the top second level circuit blocks 230 to disable all outputs of the top final logic circuit 250 and enable the outputs of the bottom final logic circuit 250 (if high), or vice versa (if low). Other variations will be apparent to those skilled in the art.

In any general implementation, the time of implementation is on the order of K ("O(K)"), because each first level circuit block 220, whose width is K, will require something like K gate delays or cycles to compute the output signal FIRST1, due to the serial dependency (via the signals A, B, C and D) involved in identifying the first one. Because M such computations are done in parallel, a time savings is realized. For example, the illustrated apparatus 200, for which N=16, M=4 and K=4, requires four gate delays for the first level circuit blocks 220 plus four gate delays for the second level circuit blocks 230 plus approximately one gate delay for the final logic circuit 250 are required, resulting in a grand total of approximately nine gate delays, compared to 16 gate delays for serial prior art techniques. For larger values of N, the savings in delay or execution time can become significant.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for finding an element meeting a predetermined condition among an ordered set of N elements, the method comprising:
    subdividing the ordered set of N elements into M subsets, wherein 1>M>N and wherein a particular subset contains K elements;
    determining if the particular subset contains an element meeting the predetermined condition;
    identifying which element in the particular subset is the first element meeting the predetermined condition in the particular subset;
    performing the determining step for all other of the M subsets besides the particular subset;
    performing the identifying step for all other of the M subsets besides the particular subset; and
    wherein the steps of determining, identifying, performing the determining step for all other of the M subsets, and performing the identifying stop for all other of the M subsets are performed in parallel.

2. The method of claim 1 wherein the M subsets are non-overlapping.

3. The method of claim 1 wherein the elements are binary elements, and the predetermined condition is that the binary value is 1.

4. The method of claim 1 wherein each subset is contiguous within the ordered set of N elements.

5. The method of claim 1 further comprising:
    identifying, on the basis of the M results of the M determining steps, which of the M subsets is the first subset containing an element meeting the predetermined condition.

6. The method of claim 1 wherein N=128 and M=16.

7. The method of claim 1 wherein the ordered set of N elements is associated with a structure having ordered positions, and the predetermined state signifies a quality of a corresponding position in the structure.

8. The method of claim 7 wherein the structure is one selected from the group consisting of a buffer, a queue, and a stack.

9. The method of claim 7 wherein the quality is that of being occupied.

10. The method of claim 1 wherein K=8.

11. An apparatus for use with a structure having N ordered locations, each location capable of storing a variable that can be in a plurality of states including a predetermined state, the is apparatus comprising:
- a plurality of first level circuit blocks, each first level circuit block connected to a subset of the N ordered locations, each first level circuit block comprising:
  - a first logic gate having a plurality of inputs, each input connected to an element of the subset of the N ordered locations, wherein the output of the first logic gate is the predetermined state if at least one of the inputs is in the particular state; and
  - a first logic network having a plurality of inputs, each input connected to an element of the subset of the N ordered locations, wherein the first logic network outputs one or more signals indicative of the first among the subset of the N ordered locations to be in the predetermined state.

12. The apparatus of claim 11 further comprising:
- a set of one or more second level circuit blocks, each second level circuit block comprising:
  - a second logic network having a plurality of inputs, each input connected to one of the first logic network outputs, wherein the second level logic network outputs one or more signals indicative of the first of the first logic network outputs in the particular state.

13. The apparatus of claim 12 wherein each of the set of one or more second level circuit blocks further comprises:
- a second logic gate having a plurality of inputs, each input connected to one of the first logic network outputs, wherein the output of the second logic gate is the predetermined state if at least one of the inputs is in the predetermined state.

14. The apparatus of claim 12 further comprising:
- a final logic circuit having a first set of N inputs, a second set of inputs and N outputs, each of the first set of N inputs connected to one of the first logic network outputs, each of the second set of inputs connected to an output from one of the second logic network, wherein the N outputs are indicative of the first of the N ordered locations to be in the predetermined state.

15. The apparatus of claim 12 wherein the one or more signals output from the first logic network are all zero if every one of the subset of the N ordered locations are zero or in a one-hot condition if at least one of the subset of the N ordered locations are in the predetermined state, and the position of the hot bit in the output signals corresponds to the first of the first logic network inputs to be in the predetermined state.

* * * * *

UNITED STATES PATENT AND TRADEMARK OFFICE
CERTIFICATE OF CORRECTION

PATENT NO. : 6,487,550 B1 Page 1 of 1
DATED : November 26, 2002
INVENTOR(S) : Douglas J. Cutter It is certified that error appears in the above-identified patent and that said Letters Patent is hereby corrected as shown below:

Column 6,
Line 29, delete "1>M>N" ans insert therefor -- 1<M<N --
Line 43, delete "stop" and insert therefor -- step --

Signed and Sealed this

Thirteenth Day of July, 2004

JON W. DUDAS
*Acting Director of the United States Patent and Trademark Office*